US009511358B2

(12) United States Patent
Nazarpoor et al.

(10) Patent No.: US 9,511,358 B2
(45) Date of Patent: Dec. 6, 2016

(54) SPINEL COMPOSITIONS AND APPLICATIONS THEREOF

(71) Applicant: Clean Diesel Technologies, Inc., Ventura, CA (US)

(72) Inventors: Zahra Nazarpoor, Camarillo, CA (US); Stephen J. Golden, Santa Barbara, CA (US)

(73) Assignee: Clean Diesel Technologies, Inc., Oxnard, CA (US)

(*) Notice: Subject to any disclaimer, the term of this patent is extended or adjusted under 35 U.S.C. 154(b) by 0 days.

(21) Appl. No.: 14/503,003

(22) Filed: Sep. 30, 2014

(65) Prior Publication Data
US 2015/0148216 A1 May 28, 2015

Related U.S. Application Data

(63) Continuation-in-part of application No. 14/090,915, filed on Nov. 26, 2013, now Pat. No. 8,845,987.

(51) Int. Cl.
| | | |
|---|---|---|
| *B01J 29/068* | (2006.01) | |
| *B01J 23/63* | (2006.01) | |
| *B01J 23/62* | (2006.01) | |
| *B01J 23/56* | (2006.01) | |
| *B01J 23/00* | (2006.01) | |
| *B01J 23/34* | (2006.01) | |
| *B01J 23/72* | (2006.01) | |
| *B01D 53/94* | (2006.01) | |
| *B01J 23/89* | (2006.01) | |
| *C01B 3/40* | (2006.01) | |
| *C08K 3/00* | (2006.01) | |
| *H01M 4/00* | (2006.01) | |
| *C01B 13/02* | (2006.01) | |
| *C08K 3/22* | (2006.01) | |
| *B01J 37/02* | (2006.01) | |

(52) U.S. Cl.
CPC ........... *B01J 29/068* (2013.01); *B01D 53/944* (2013.01); *B01D 53/945* (2013.01); *B01J 23/005* (2013.01); *B01J 23/34* (2013.01); *B01J 23/56* (2013.01); *B01J 23/626* (2013.01); *B01J 23/63* (2013.01); *B01J 23/72* (2013.01); *B01J 23/8933* (2013.01); *B01J 23/8986* (2013.01); *C01B 3/40* (2013.01); *C01B 13/0281* (2013.01); *C08K 3/00* (2013.01); *C08K 3/22* (2013.01); *H01M 4/00* (2013.01); *B01D 2255/405* (2013.01); *B01J 37/0244* (2013.01); *C01B 2203/0233* (2013.01); *C01B 2203/1041* (2013.01); *C01B 2203/1094* (2013.01); *Y02T 10/22* (2013.01)

(58) Field of Classification Search
CPC ......... B01J 21/005; B01J 23/005; H01M 4/00; H01M 4/02; B01D 53/92; B01D 53/94; C08L 23/06; C08L 23/12; C01B 3/02; H01L 35/00
See application file for complete search history.

(56) References Cited

U.S. PATENT DOCUMENTS

| | | | |
|---|---|---|---|
| 3,284,370 A | | 11/1966 | Alan et al. |
| 3,473,987 A | | 10/1969 | Sowards |
| 3,493,325 A | | 2/1970 | Roth |
| 3,896,616 A | | 7/1975 | Keith et al. |
| 3,904,553 A | | 9/1975 | Campbell et al. |
| 4,029,738 A | * | 6/1977 | Courty ................. B01D 53/945 423/213.2 |
| 4,062,810 A | | 12/1977 | Vogt et al. |
| 4,113,921 A | * | 9/1978 | Goldstein ........... H01M 6/5005 429/219 |
| 4,188,309 A | | 2/1980 | Volker et al. |
| 4,199,328 A | | 4/1980 | Cole et al. |
| 4,261,862 A | | 4/1981 | Kinoshita et al. |
| 4,274,981 A | | 6/1981 | Suzuki et al. |
| 4,297,150 A | | 10/1981 | Sims et al. |
| 4,297,328 A | | 10/1981 | Ritscher et al. |
| 4,414,023 A | | 11/1983 | Aggen et al. |
| 4,629,472 A | | 12/1986 | Haney, III et al. |
| 4,661,329 A | | 4/1987 | Suzuki et al. |
| 4,673,556 A | | 6/1987 | McCabe et al. |
| 4,790,982 A | | 12/1988 | Yoo et al. |
| 4,797,329 A | | 1/1989 | Kilbane et al. |
| 4,885,269 A | | 12/1989 | Cyron |
| 4,891,050 A | | 1/1990 | Bowers et al. |
| 4,892,562 A | | 1/1990 | Bowers et al. |
| 4,906,443 A | | 3/1990 | Gandhi et al. |
| 5,034,020 A | | 7/1991 | Epperly et al. |
| 5,063,193 A | | 11/1991 | Bedford et al. |

(Continued)

FOREIGN PATENT DOCUMENTS

| | | |
|---|---|---|
| CH | 644637 A5 | 8/1984 |
| CN | 102172527 | 9/2011 |

(Continued)

OTHER PUBLICATIONS

Alini, S. et al., *Development of new catalysts for N2O-decomposition from adipic acid plant*, Applied Catalysis B: Environmental, 70, (2007) 323-329.
Azad et al. *Examining the Cu-Mn-O Spinel System as an Oxygen Carrier in Chemical Looping Combustion*, Energy Technology, vol. 1, Issue 1, (2013) 59-69.
Barrett, E. P. et al., *The determination of pore volume and area distributions in porous substances. I. Computations from nitrogen isotherms*, J. A. Chem. Soc. (1951) 73, 373-380.
Brunaubr, S. et al., *Adsorption of Gases in Multimolecular Layers*, J. Am. Chem. Soc. 1938, 60, 309-319.
Bugarski, Aleksandar, *Exhaust Aftertreatment Technologies for Curtailment of Diesel Particulate Matter and Gaseous Emissions*, Disesel Aerosols and Gases in Underground Metal and Nonmetal Mines. Power Point Presentation. 14th U.S./North American Mine Ventilation Symposium, Salt Lake City, Utah, Jun. 17th, 2012. Slides 1-44. http://www.cdc.gov/niosh/mining/use.

(Continued)

Primary Examiner — Timothy Vanoy
(74) Attorney, Agent, or Firm — Alston & Bird LLP

(57) ABSTRACT

Spinels having a general formula of $AB_2O_4$, where A and B are a transition metal but not the same transition metal are disclosed. Spinel and spinel compositions of the application are useful in various applications and methods as further described.

50 Claims, No Drawings

(56) References Cited

U.S. PATENT DOCUMENTS

| | | |
|---|---|---|
| 5,157,007 A | 10/1992 | Domesle et al. |
| 5,162,284 A | 11/1992 | Soled et al. |
| 5,168,836 A | 12/1992 | Kraus |
| 5,175,132 A | 12/1992 | Ketcham et al. |
| 5,182,249 A | 1/1993 | Wang et al. |
| 5,203,166 A | 4/1993 | Miller |
| 5,238,898 A | 8/1993 | Han et al. |
| 5,266,083 A | 11/1993 | Peter-Hoblyn et al. |
| 5,364,517 A | 11/1994 | Dieckmann et al. |
| 5,371,056 A | 12/1994 | Leyrer et al. |
| 5,404,841 A | 4/1995 | Valentine |
| 5,501,714 A | 3/1996 | Valentine et al. |
| 5,535,708 A | 7/1996 | Valentine |
| 5,580,553 A | 12/1996 | Nakajima |
| 5,584,894 A | 12/1996 | Peter-Hoblyn et al. |
| 5,658,543 A | 8/1997 | Yoshida et al. |
| 5,693,106 A | 12/1997 | Peter-Hoblyn et al. |
| 5,708,233 A * | 1/1998 | Ochi .................. H01L 35/22 136/201 |
| 5,721,188 A | 2/1998 | Sung et al. |
| 5,732,548 A | 3/1998 | Peter-Hoblyn et al. |
| 5,743,922 A | 4/1998 | Peter-Hoblyn et al. |
| 5,747,410 A | 5/1998 | Muramatsu et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn et al. |
| 5,868,421 A | 2/1999 | Eyrainer |
| 5,879,645 A | 3/1999 | Park et al. |
| 5,898,015 A | 4/1999 | Yokoi et al. |
| 5,921,080 A | 7/1999 | Ulmet et al. |
| 5,924,280 A | 7/1999 | Tarabulski |
| 5,939,354 A | 8/1999 | Golden |
| 5,965,099 A | 10/1999 | Hartweg et al. |
| 5,968,462 A | 10/1999 | Suzuki |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,129,834 A | 10/2000 | Peters et al. |
| 6,203,770 B1 | 3/2001 | Peter-Hoblyn et al. |
| 6,232,253 B1 | 5/2001 | Narula et al. |
| 6,279,603 B1 | 8/2001 | Czarnik et al. |
| 6,293,096 B1 | 9/2001 | Khair et al. |
| 6,352,955 B1 | 3/2002 | Golden |
| 6,361,754 B1 | 3/2002 | Peter-Hoblyn et al. |
| 6,372,686 B1 | 4/2002 | Golden |
| 6,395,244 B1 | 5/2002 | Hartweg et al. |
| 6,444,178 B1 * | 9/2002 | Hartweg ............ B01D 53/9418 422/172 |
| 6,468,941 B1 | 10/2002 | Bortun et al. |
| 6,531,425 B2 | 3/2003 | Golden |
| 6,576,587 B2 | 6/2003 | Labarge et al. |
| 6,605,264 B2 | 8/2003 | Bortun et al. |
| 6,624,113 B2 | 9/2003 | Labarge et al. |
| 6,632,557 B1 * | 10/2003 | Curelop ............ H01M 2/0285 29/623.1 |
| 6,652,829 B2 | 11/2003 | Barnes et al. |
| 6,696,389 B1 | 2/2004 | Boegner et al. |
| 6,747,180 B2 | 6/2004 | Ostgard et al. |
| 6,774,080 B2 | 8/2004 | LaBarge et al. |
| 6,858,193 B2 | 2/2005 | Ruwisch et al. |
| 6,915,629 B2 | 7/2005 | Szymkowicz |
| 6,938,411 B2 | 9/2005 | Hoffmann et al. |
| 6,948,926 B2 | 9/2005 | Valentine et al. |
| 7,014,825 B2 | 3/2006 | Golden |
| 7,129,194 B2 | 10/2006 | Baca et al. |
| 7,374,729 B2 | 5/2008 | Chen et al. |
| 7,393,809 B2 | 7/2008 | Kim |
| 7,485,273 B2 | 2/2009 | Gandhi et al. |
| 7,563,744 B2 | 7/2009 | Klein et al. |
| 7,576,029 B2 | 8/2009 | Saito et al. |
| 7,641,875 B1 | 1/2010 | Golden |
| 7,749,472 B2 | 7/2010 | Chen et al. |
| 7,772,147 B2 | 8/2010 | Collier et al. |
| 7,785,544 B2 | 8/2010 | Alward et al. |
| 7,803,338 B2 | 9/2010 | Socha et al. |
| 7,875,250 B2 | 1/2011 | Nunan |
| 7,875,573 B2 | 1/2011 | Beutel et al. |
| 7,943,104 B2 | 5/2011 | Kozlov et al. |
| 8,080,494 B2 | 12/2011 | Yasuda et al. |
| 8,148,295 B2 | 4/2012 | Augustine |
| 8,158,551 B2 | 4/2012 | Verdier et al. |
| 8,168,125 B2 | 5/2012 | Choi |
| 8,242,045 B2 | 8/2012 | Kulkarni et al. |
| 8,318,629 B2 | 11/2012 | Alive et al. |
| 8,802,582 B2 | 8/2014 | Malyala et al. |
| 8,845,987 B1 * | 9/2014 | Nazarpoor ........... B01D 53/945 423/213.2 |
| 8,853,121 B1 | 10/2014 | Nazarpoor et al. |
| 8,858,903 B2 | 10/2014 | Nazarpoor |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2002/0114746 A1 | 8/2002 | Roark et al. |
| 2002/0131914 A1 | 9/2002 | Sung |
| 2003/0092566 A1 | 5/2003 | Inoue et al. |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2003/0221360 A1 | 12/2003 | Brown et al. |
| 2004/0018939 A1 | 1/2004 | Chigapov et al. |
| 2004/0033175 A1 | 2/2004 | Ohno et al. |
| 2004/0048125 A1 * | 3/2004 | Curelop ............ H01M 2/0285 429/406 |
| 2004/0087439 A1 | 5/2004 | Hwang et al. |
| 2004/0098905 A1 | 5/2004 | Valentine et al. |
| 2004/0151647 A1 | 8/2004 | Wanninger et al. |
| 2004/0166035 A1 | 8/2004 | Noda et al. |
| 2004/0172876 A1 | 9/2004 | Sprague et al. |
| 2004/0254062 A1 | 12/2004 | Crocker et al. |
| 2005/0095188 A1 | 5/2005 | Matsumoto et al. |
| 2005/0132674 A1 | 6/2005 | Toyoda et al. |
| 2005/0145827 A1 | 7/2005 | McCabe et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0197244 A1 | 9/2005 | L'vovich et al. |
| 2005/0207956 A1 | 9/2005 | Vierheilig |
| 2005/0217751 A1 | 10/2005 | Valentine et al. |
| 2005/0227867 A1 | 10/2005 | Chen et al. |
| 2005/0265920 A1 | 12/2005 | Ercan et al. |
| 2006/0081922 A1 | 4/2006 | Golden |
| 2006/0100097 A1 | 5/2006 | Chigapov et al. |
| 2006/0120936 A1 | 6/2006 | Alive et al. |
| 2006/0166816 A1 | 7/2006 | Zhang et al. |
| 2006/0223694 A1 | 10/2006 | Gandhi et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2006/0292342 A1 | 12/2006 | Ohno et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0072705 A1 | 3/2008 | Chaumonnot et al. |
| 2008/0075646 A1 | 3/2008 | Mussmann et al. |
| 2008/0119353 A1 | 5/2008 | Jia et al. |
| 2008/0125308 A1 | 5/2008 | Fujdala et al. |
| 2008/0166282 A1 | 7/2008 | Golden et al. |
| 2008/0190099 A1 | 8/2008 | Yezerets et al. |
| 2008/0210184 A1 | 9/2008 | Valentine et al. |
| 2008/0226524 A1 | 9/2008 | Alive et al. |
| 2009/0004083 A1 | 1/2009 | Valentine et al. |
| 2009/0134365 A1 * | 5/2009 | Sasaki .................. C04B 35/016 252/519.1 |
| 2009/0220697 A1 | 9/2009 | Addiego |
| 2009/0274903 A1 | 11/2009 | Addiego |

(56) References Cited

U.S. PATENT DOCUMENTS

| | | |
|---|---|---|
| 2009/0304566 A1 | 12/2009 | Golden et al. |
| 2009/0324468 A1 | 12/2009 | Golden et al. |
| 2009/0324469 A1 | 12/2009 | Golden et al. |
| 2009/0324470 A1 | 12/2009 | Alamdari et al. |
| 2010/0062293 A1* | 3/2010 | Triantafyllopoulos H01M 8/0625 429/423 |
| 2010/0111796 A1 | 5/2010 | Caudle et al. |
| 2010/0152032 A1 | 6/2010 | Galligan |
| 2010/0168449 A1 | 7/2010 | Grey et al. |
| 2010/0180581 A1 | 7/2010 | Grubert et al. |
| 2010/0184590 A1 | 7/2010 | Althofer et al. |
| 2010/0193104 A1* | 8/2010 | Ryu ............... C01G 45/1235 156/62.2 |
| 2010/0229533 A1 | 9/2010 | Li et al. |
| 2010/0233045 A1 | 9/2010 | Kim et al. |
| 2010/0240525 A1 | 9/2010 | Golden et al. |
| 2010/0266473 A1 | 10/2010 | Chen et al. |
| 2010/0290964 A1 | 11/2010 | Southward et al. |
| 2010/0293929 A1 | 11/2010 | Zhan et al. |
| 2010/0316545 A1 | 12/2010 | Alive et al. |
| 2010/0316547 A1 | 12/2010 | Justice et al. |
| 2011/0053763 A1 | 3/2011 | Verdier et al. |
| 2011/0150742 A1 | 6/2011 | Han et al. |
| 2011/0239626 A1 | 10/2011 | Makkee et al. |
| 2012/0015801 A1 | 1/2012 | Deprez et al. |
| 2012/0039775 A1 | 2/2012 | Schirmeister et al. |
| 2012/0183447 A1 | 7/2012 | Kwan et al. |
| 2013/0012378 A1 | 1/2013 | Meyer et al. |
| 2013/0058848 A1 | 3/2013 | Nunan et al. |
| 2013/0115144 A1 | 5/2013 | Golden et al. |
| 2013/0130032 A1* | 5/2013 | Kuo ........................ B32B 5/16 428/402 |
| 2013/0172177 A1 | 7/2013 | Domke et al. |
| 2013/0189173 A1 | 7/2013 | Hilgendorff |
| 2013/0236380 A1 | 9/2013 | Golden et al. |
| 2013/0323145 A1 | 12/2013 | Tran et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274663 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor et al. |
| 2015/0005159 A1 | 1/2015 | Nazarpoor |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor |
| 2015/0182954 A1 | 7/2015 | Nazarpoor |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor |
| 2016/0030885 A1 | 2/2016 | Hatfield |
| 2016/0047751 A1 | 2/2016 | Pless et al. |
| 2016/0082422 A1 | 3/2016 | Nazarpoor |
| 2016/0121304 A1 | 5/2016 | Nazarpoor |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |

FOREIGN PATENT DOCUMENTS

| | | | |
|---|---|---|---|
| CN | 102371153 A * | 3/2012 | ............ B01J 23/60 |
| EP | 0022349 | 1/1981 | |
| EP | 0450897 | 10/1991 | |
| EP | 0541271 | 5/1993 | |
| EP | 0605142 | 7/1994 | |
| EP | 1 232 790 | 8/2002 | |
| EP | 1 256 382 | 11/2002 | |
| EP | 1 656 993 | 5/2006 | |
| JP | 62-20613 | 1/1987 | |
| JP | 4-215853 | 8/1992 | |
| JP | 09-271665 | 10/1997 | |
| JP | 4144174 | 9/2008 | |
| JP | 2013-27858 A * | 2/2013 | ............ B01J 23/745 |
| PL | 404146 A1 * | 12/2014 | ............ B01J 37/12 |
| WO | WO 90/07561 | 7/1990 | |
| WO | WO 94/11467 | 5/1994 | |
| WO | WO 95/02655 | 1/1995 | |
| WO | WO 97/04045 | 2/1997 | |
| WO | WO 97/09523 | 3/1997 | |
| WO | WO 97/28358 | 8/1997 | |
| WO | WO 97/36676 | 10/1997 | |
| WO | WO 98/22209 A1 | 5/1998 | |
| WO | WO 98/28070 A1 | 7/1998 | |
| WO | WO 00/30739 A1 | 6/2000 | |
| WO | WO 00/75643 A1 | 12/2000 | |
| WO | WO 01/85876 A1 | 11/2001 | |
| WO | WO 03/068363 A1 | 8/2003 | |
| WO | WO 2004/058641 A1 | 7/2004 | |
| WO | WO 2008099847 A1 * | 8/2008 | ............ B01J 23/005 |
| WO | WO 2009/139860 A1 | 11/2009 | |
| WO | WO 2011/068509 A1 | 6/2011 | |
| WO | WO 2012/093600 | 7/2012 | |

(56) References Cited

FOREIGN PATENT DOCUMENTS

| WO | WO 2012/166514 | 12/2012 |
|----|----------------|---------|
| WO | WO 2013/004814 | 1/2013 |
| WO | WO 2013/028575 | 2/2013 |
| WO | WO 2013/044115 | 3/2013 |
| WO | WO 2013/068243 | 5/2013 |
| WO | WO 2013/121112 | 8/2013 |
| WO | WO 2013/153081 | 10/2013 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |

OTHER PUBLICATIONS

D. Panayotov, "Interaction Between NO, CO and O2 ON gamma-AL2O3-Supported Copper-Manganese Oxides", 1996, React.Kinet. Catal.Lett. vol. 58, No. 1, 73-78.

Extended European Search Report for corresponding European Application No. 09770546.1 dated Sep. 26, 2012, 6 pages.

Extended European Search Report for corresponding European Application No. 09770547.9 dated Dec. 7, 2012, 5 pages.

Hayes et al., "Introduction to Catalytic Combustion", pp. 310-313, 1997 OPA (Overseas Publishers Association).

He, H. et al., *An investigation of NO/CO reaction over perovskite-type oxide La0.8Ce0.2B0.4Mn0.6O3 (B=Cu or Ag) catalysts synthesized by reverse microemulsion*, Catalysis Today, vol. 126 (2007) 290-295.

International Preliminary Report on Patentability (Chapter II) from International Application No. PCT/US2009/003800, dated May 11, 2010.

International Search Report and Written Opinion for corresponding International Application No. PCT/US2009/003799, dated Oct. 8, 2009.

International Search Report and Written Opinion for corresponding International Application No. PCT/US2009/003800 dated Oct. 22, 2009.

International Search Report and Written Opinion for corresponding International Application No. PCT/US2014/030597 dated Aug. 13, 2014.

International Search Report and Written Opinion for corresponding International Application No. PCT/US2014/033041 dated Aug. 20, 2014.

International Search Report and Written Opinion for corresponding International Application No. PCT/US2014/037452 dated Sep. 15, 2014.

International Search Report and Written Opinion for corresponding International Application No. PCT/US2014/044221, dated Oct. 3, 2014.

International Search Report and Written Opinion for corresponding International Application No. PCT/US2014/044222 dated Oct. 3, 2014.

International Search Report and Written Opinion for corresponding International Application No. PCT/US2014/046512 dated Apr. 6, 2015.

International Search Report and Written Opinion for corresponding International Application No. PCT/US2014/054874, dated Nov. 13, 2014.

International Search Report and Written Opinion for corresponding International Application No. PCT/US2014/055063 dated Nov. 24, 2014.

International Search Report and Written Opinion for corresponding International Application No. PCT/US2014/067541 dated Feb. 4, 2015.

International Search Report and Written Opinion for corresponding International Application No. PCT/US2014/067569, dated Apr. 3, 2015.

International Search Report and Written Opinion for corresponding International Application No. PCT/US2014/067589, dated Feb. 10, 2015.

International Search Report and Written Opinion for corresponding International Application No. PCT/US2015/025267 dated Jul. 2, 2015.

International Search Report and Written Opinion for corresponding International Application No. PCT/US2015/025299 dated Jul. 2, 2015.

Ishizaki, K. et al., *A Study of PGM-Free Oxidation Catalyst YMnO3 for Diesel Exhaust Aftertreatment*, SAE Technical Paper, (2012) http://papers.sae.org/2012-01-0365/.

K. S. Abdel Halim et al. "Catalytic Oxidation of CO Gas over Nanocrystallite CuxMn1-xFe2O4", Feb. 26, 2008, Top Catalyst (2008) 47:66-72.

Kucharczyk, B. et al., *Partial substitution of lanthanum with silver in the LaMnO3 perovskite: Effect of the modification on the activity of monolithic catalysts in the reactions of methane and carbon oxide oxidation*, Applied Catalysis A: General, vol. 335 (2008) 28-36.

Mestres, L. et al., *Phase Diagram at Low Temperature of the System ZrO2/Nb2O5*, Z. Anorg. Alig. Chem., vol. 627 (2001) 294-298.

Papavasilious et al., "Combined Steam reforming of methanol over Cu-Mn spinel oxide catalysts", Journal of Catalysis 251 (2007) 7-20.

Reddy et al., *Selective Ortho-Methylation of Phenol with Methanol over Copper Manganese Mixed-Oxide Spinel Catalysts*, Journal of Catalysis, vol. 243 (2006) 278-291.

Suh, J. K. et al., *Characterization of transition metal-impregnated La-Al complex oxides for catalytic combustion*, Microporous Materials (1995) 657-664.

Tanaka et al., "Influence of preparation method and additive for Cu-Mn spinel oxide catalyst on water gas shift reaction of reformed fuels", Applied Catalysis A: General 279 (2005) 59-66.

Wei, P. et al., *In situ high-temperature X-ray and neutron diffraction of Cu-Mn oxide phases*, J. Mater Sci. (2010) 45: 1056-1064.

\* cited by examiner

SPINEL COMPOSITIONS AND APPLICATIONS THEREOF

CROSS-REFERENCE TO RELATED APPLICATIONS

This application is a continuation-in-part of U.S. patent application Ser. No. 14/090,915, filed Nov. 26, 2013, entitled "Method for Improving Lean Performance of PGM Catalyst Systems: Synergized PGM", now U.S. Pat. No. 8,845,987, issued Sep. 30, 2014, the entirety of which is incorporated by reference as if fully set forth herein.

The present disclosure is related to U.S. patent application Ser. No. 14/090861, entitled "System and Methods for Using Synergized PGM as a Three-Way Catalyst", and U.S. patent application Ser. No. 14/090887, entitled "Oxygen Storage Capacity and Thermal Stability of Synergized PGM Catalyst System", as well as U.S. patent application entitled "Systems and Methods for Managing a Synergistic Relationship between PGM and Copper-Manganese in a Three Way Catalyst Systems", all filed Nov. 26, 2013, the entireties of which are incorporated by reference as if fully set forth herein.

BACKGROUND

The present disclosure relates to spinel compositions and in particular, spinel catalysts. Spinel compositions as disclosed herein can be used for various applications, such as a catalyst to clean emissions, an oxygen storage material, petrochemical catalyst, etc.

SUMMARY

Spinels and spinel compositions are disclosed herein. In particular, a spinel has a general formula of $AB_2O_4$, where A and B are a transition metal but not the same transition metal. A spinel as disclosed herein can be rare-earth metal free. In an illustrative embodiment, a spinel can include a minor component. In an embodiment, a spinel includes a minor component that is a dopant. A spinel composition can include a spinel as disclosed herein on a substrate.

Spinel and spinel compositions have useful applications in catalysts, oxygen support materials, and batteries. Catalysts comprising a spinel have useful applications in converting exhaust from a combustion engine into useful gases or non-toxic gases. Spinels can also be incorporated into or coated on polymers. Battery anodes and/or cathodes can include a spinel in an active ingredient.

DETAILED DESCRIPTION

Spinel Compositions

Spinel compositions have a variety of applications, including but not limited to catalysts, oxygen support material, anodes and cathodes, gas sensors, etc. Spinels are a mineral oxide having the general formula of $AB_2O_4$ and may be supported on a plurality of support oxides. Thereby the A component is tetrahedrally coordinated with the oxygens and the B component is octahedrally coordinated with the oxygens. Spinels may include a transition metal (e.g., iron (Fe), manganese (Mn), nickel (Ni), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), etc.) and an "other metal" (i.e., aluminum (Al), magnesium (Mg), gallium (Ga), tin (Sn), thallium (Tl), lead (Pb), bismuth (Bi), or indium (In)).

In an illustrative embodiment, a spinel composition includes copper, nickel, cobalt, iron, manganese, or chromium at any concentration, including quaternary, ternary, and binary combinations thereof. Ternary combinations include Cu—Mn—Fe, Cu—Mn—Co, Cu—Fe—Ni, Cu—Co—Fe, Cu—Mn—Ni, Cu—Mn—Co, and Cu—Co—Ni. Binary combinations include Cu—Mn, Cu—Fe, Cu—Co, Cu—Ni, Cu—Ni, Mn—Fe, Mn—Co, Mn—Ni, Co—Ni, and Co—Fe.

In another embodiment, a spinel composition can be rare-earth metal free. In an embodiment, a spinel composition can also be substantially rare-earth metal free (i.e., trace amounts). In an embodiment, a rare-earth metal free spinel can include copper, nickel, cobalt, iron, manganese, or chromium at any concentration, including quaternary, ternary, and binary combinations thereof. In a further embodiment, a spinel composition as disclosed herein can also include dopants or minor components.

In an illustrative embodiment, the spinel can also include a dopant. A dopant is present in low levels and sits on the A or B site of the spinel. Thus, a doped spinel would have a formula of $AB_{2-x}D_xO_4$ or $A_{1-x}D_xB_2O_4$, where D is the dopant. In an embodiment, a dopant can be vanadium, silver, palladium, ruthenium, rhodium, platinum, molybdenum, tin, calcium (Ca), strontium (Sr), barium (Ba), lithium (Li), titanium, lanthanum (La), samarium (Sm), gadolinium (Gd), yttrium (Y), neodymium (Nd), cerium (Ce), aluminum, gallium, magnesium, zirconium (Zr), and tungsten (W). In an example, a spinel composition comprising $CuFe_2O_4$ can be doped by aluminum to form $CuFe_{2-x}Al_xO_4$.

A spinel made with any transition metal and either a low valence or a high valence dopant. A low valence dopant is a dopant whose oxidation state is lower than the expected oxidation state of transition metal. A high valence dopant is one which has an oxidation state that is higher than the expected oxidation state of the transition metal. In an embodiment, a spinel composition can be built from the group consisting of copper, nickel, cobalt, iron, manganese, chromium, and combinations thereof with deliberate doping of aliovalant cations (cations with valence different from the host). Aliovalant cations can be lower or higher than the host cation. For example, $CuFe_2O_4$ includes $Cu^{2+}$ and $Fe^{3+}$. This spinel can be doped with $Nb^{5+}$ to form $CuFe_{2-x}Nb_xO_4$—with the pentavalent $Nb^{5+}$ doping the trivalent $Fe^{3+}$ site. Another example is $Ca^{2+}$ doping a $Fe^{3+}$ site (i.e., a lower valence dopant).

Supports

A substrate may be, without ion, a refractive material, a ceramic substrate, a honeycomb structure, a metallic substrate, a ceramic foam, a metallic foam, a reticulated foam, or suitable combinations, where the substrate has a plurality of channels and at least the required porosity. Porosity is substrate dependent as is known in the art. Additionally, the number of channels may vary depending upon the substrate used as is known in the art. Preferably, substrates, either metallic or ceramic, offer a three-dimensional support structure.

A spinel as described herein can be deposited on a substrate with a separate platinum group metal (PGM) component. For example, a PGM can be one or more of platinum, palladium, rhodium, etc. and can be mixed with a spinel to produce a coated substrate. In an embodiment, a single layer catalyst with two phases is inter-mixed. In an embodiment, the spinel is combined with a PGM component, on its own or supported on a conventional carrier like alumina, titania, zirconia, ceria, cerium-based OSM, tin oxide, zeolite etc. In a double layer catalyst, a spinel layer can be distinct from a PGM containing layer. In another double layer embodiment, a first PGM is combined with a spinel in a first layer, and a second PGM is combined with a spinel in a second layer. In another embodiment, a PGM component can be impregnated or coated onto a surface of a spinel composition. In yet another embodiment, a substrate may be zone-coated with a spinel in one region and with a PGM component in a different region. In another embodiment, a substrate may be zone-coated with a PGM on a spinel composition in one region of the substrate and with a spinel without PGM in a different region.

A substrate can be of any suitable material, e.g., cordierite.

In an illustrative embodiment, a spinel composition as described herein can be deposited on a substrate with a separate zero platinum group metal (ZPGM) component. A carrier material oxide may include $TiO_2$, doped $TiO_2$, $Ti_{1-x}Nb_xO_2$, $SiO_2$, Alumina and doped alumina, $ZrO_2$ and doped $ZrO_2$, $Nb_2O_5$—$ZrO_2$, $Nb_2O_5$—$ZrO_2$—$CeO_2$ and combinations thereof.

A spinel can be supported or mixed with any individual or combination of refractory oxides (e.g., transition alumina, alpha alumina, titania, zeolite, silica, silicate, magnesium-silicate, silica-alumina, ceria, ceria-zirconia, lanthanide-doped ceria-zirconia, lanthanum doped alumina, etc.). A support oxide can be a mixed metal oxide such as a Ceria-Zirconia type material; a Sn—Ti—Zr oxide; an $A_2B_2O_7$ pyrochlore; an $ABO_3$ perovskite; an $AB_2O_5$ pseudo-brookite; a non-transition metal spinel such as $MgAl_2O_4$; etc.

A support oxide can be a composite or multi-phase material. A class of such materials (a mixture but not physical mixed, e.g., two components where the phases are immediately adjacent to one another) would be alumina-zirconia, alumina-ceria-zirconia, or alumina-ceria materials. In an embodiment, a support oxide can be a 2-phase oxide comprising an alumina and a fluorite phase. Alternatively, a composite can be a three-phase material such as Al—Zr—Nb—O, where the three phases are alumina, zirconia and niobia, or Al—Zr—La—O, where the three phases are alumina, zirconia and lanthanum. Using different support oxides provides flexibility for a range of environments and "promotional effects" on the spinel catalyst phase activity. For example, cerium dioxide or doped cerium dioxide can be a physical support for a spinel but that can also promote or enhance catalytic activity through the donation or acceptance of active oxygen species to the spinel surface. In embodiments disclosed herein, spinel reactivity with support components is minimized, thereby reducing or preventing formation of deleterious second phases and damaging phase transformations in the support oxide that can lead to a significant loss of surface area.

In an embodiment, a spinel can be formed into a composite powder. The powder can be formed with at least one oxide support known in the field by traditional methods of mixing, milling, co-precipitation, incipient wetness, impregnation, etc.

In an illustrative embodiment, a co-precipitation method includes adding an appropriate amount of at least one of NaOH solution, $Na_2CO_3$ solution, and ammonium hydroxide ($NH_4OH$) solution. The pH of a carrier oxide support slurry may be adjusted to about 7 to about 9, and the slurry may be aged for a period of time of about 12 to 24 hours, while stirring. A precipitate may be formed over a slurry including at least one suitable carrier material oxide, where the slurry may include any number of additional suitable carrier material oxides, and may include one or more suitable oxygen storage materials. After precipitation, a metal oxide slurry may then undergo filtering and washing, where the resulting material may be dried and may later be calcined at any suitable temperature of about 300° C. to about 600° C., preferably about 500° C. for about 5 hours. Metal salt solutions are also suitable for use in co-precipitation reactions. Suitable metal salt solutions include, but are not limited to, copper nitrate, copper acetate, manganese nitrate, and manganese acetate.

In one embodiment, a substrate may be in the form of beads or pellets. Beads or pellets may be formed from, without limitation, alumina, silica alumina, silica, titania, mixtures thereof, or any suitable material. In another embodiment, a substrate may be, without limitation, a honeycomb substrate. A honeycomb substrate may be a ceramic honeycomb substrate or a metal honeycomb substrate. A ceramic honeycomb substrate may be formed from, for example without limitation, sillimanite, zirconia, petalite, spodumene (lithium aluminum silicate), magnesium silicates, mullite, alumina, cordierite (e.g. $Mg_2A_{14}Si_5O_{18}$), other alumino-silicate materials, silicon carbide, aluminum nitride, or combinations thereof. Other ceramic substrates would be apparent to one of ordinary skill in the art.

If a substrate is a metal honeycomb substrate, the metal may be, without limitation, a heat-resistant base metal alloy, particularly an alloy in which iron is a substantial or major component. A surface of the metal substrate may he oxidized at elevated temperatures above about 1000° C. to improve (he corrosion resistance of an alloy by forming an oxide layer on the surface of the alloy. This oxide layer on the surface of the alloy may also enhance the adherence of a washcoat to the surface of the monolith substrate.

In one embodiment, a substrate may be a monolithic carrier having a plurality of fine, parallel flow passages extending through the monolith. Passages can be of any suitable cross-sectional shape and/or size. Passages may be, for example without limitation, trapezoidal, rectangular, square, sinusoidal, hexagonal, oval, or circular, although other shapes are also suitable. A monolith may contain from about 9 to about 1200 or more gas inlet openings or passages per square inch of cross section, although fewer passages may be used.

A substrate can also be any suitable filter for particulates. Some suitable forms of substrates may include, without limitation, woven filters, particularly woven ceramic fiber filters, wire meshes, disk filters, ceramic honeycomb monoliths, ceramic or metallic foams, wall flow filters, and other suitable filters. Wall flow filters are similar to honeycomb substrates for automobile exhaust gas catalysts. Wall flow filters may differ from the honeycomb substrate that may be used to form normal automobile exhaust gas catalysts in that the channels of the wall flow filter may be alternately plugged at an inlet and an outlet so that the exhaust gas is forced to flow through the porous walls of the wall flow filter while traveling from the inlet to the outlet of the wall flow filler.

Washcoats

According to an embodiment, at least a portion of a catalyst may be placed on a substrate in the form of a washcoat. Oxide solids in a washcoat may be one or more carrier material oxide, one or more catalyst, or a mixture of carrier triate oxide(s) and catalyst(s). Carrier triaterial oxides are normally stable at high temperatures (>1000° C.) and under a range of reducing and oxidizing conditions. Examples of oxygen storage material include, but are not limited to a mixture of ceria and zirconia; more preferably a mix re of (1) ceria, zirconia, and lanthanum or (2) ceria, zirconia, neodymium, and praseodymium.

According to an embodiment, if a catalyst comprises at least one oxygen storage material, the catalyst may comprise about 10 to about 90 weight percent oxygen storage material, preferably about 20 to about 80 weight percent, more preferably about 40 to about 75 weight percent. The weight percent of the oxygen storage material is on the basis of the oxides. Various amounts washcoats may be coupled with a substrate, preferably an amount that covers most of, or all of, the surface area of a substrate. In an embodiment, about 80 g/L to about 250 g/L of a washcoat may be coupled with a substrate.

In an embodiment, a washcoat may be formed on a substrate by suspending oxide solids in water to form an aqueous slurry and depositing the aqueous slurry on the substrate as a washcoat. Other components may optionally be added to an aqueous slurry. Other components such as acid or base solutions or various salts or organic compounds may be added to an aqueous slurry adjust the rheology of the slurry and/or enhance binding of the washcoat to the substrate. Some examples of compounds that can be used to adjust the rheology include, but are not limited to, ammonium hydroxide, aluminum hydroxide, acetic acid, citric acid, tetraethylammonium hydroxide, other tetraalkylammonium salts, ammonium acetate, ammonium citrate, glycerol, commercial polymers such as polyethylene glycol, polyvinyl alcohol anti other suitable polymers.

The slurry may be placed on a substrate in any suitable manner. For example, without limitation, a substrate may be dipped into the slurry, or the slurry may be sprayed on the substrate. Other methods of depositing a slurry onto a substrate known to those skilled in the art may be used in alternative embodiments. If a substrate is a monolithic carrier with parallel flow passages, a washcoat may be formed on the walls of the passages. Gas flowing through the flow passages can contact a washcoat on the walls of the passages as well as materials that are supported on the washcoat.

Spinel with a Second Phase Oxide

A spinel can be mixed with a second phase oxide. Second phase oxides include, but are not limited to, fluorites, pyrochlores, perovskites, pseudo-brookites, rock-salts, lanthanum oxide, titanium oxide, tin oxide, and silver oxide. In an embodiment, a composite multi-phase mixture as described herein can be deposited on any of conventional oxide carrier materials known in the art (e.g., alumina, silica, zeolite, Ceria-Zirconia, titania, etc.).

In an embodiment, a second phase oxide can be a fluorite such as $CeO_2$, $ZrO_2$, or solid solutions of both. In an embodiment, a second phase oxide can be Zircona, ceria-zirconia, or Ln-doped ceria-zirconia solid solutions. A mixed phase material such as these can provide improved sintering resistance of the spinel phase. Both phases can be made with crystallite sizes of about 2 nm to about 50 nm.

In another embodiment, the second phase oxide can be a pyrochlore. A spinel composition as disclosed herein can be mixed with a second phase pyrochlore with a formula of $A_2B_2O_7$, where A is La, Y, or any element known in the art to occupy the Pyrochlore A-site; and B can be a smaller cation such as Mn, Ti, Sn or any element known in the art to occupy the B site. A mixed phase material such as these can provide improved sintering resistance of the spinel phase. Both phases can be made with crystallite sizes of about 2 nm to about 50 nm.

In another embodiment, the second phase oxide can be a perovskite. A spinel composition as disclosed herein can be mixed with a second phase perovskite with a formula of $ABO_3$, where A can be any lanthanide, alkali metal, alkaline earth, and any element known in the art to occupy the Perovskite A-site; and B can be any transitional metal (e.g., Mn, Co, Cu, Fe, Pd, Pt, Rh. Cr, Ni, etc.) or any element known in the art to occupy the B site. A mixed phase material such as these can provide improved sintering resistance of the spinel phase. Both phases can be made with crystallite sizes of about 2 nm to about 50 nm.

In another embodiment, the second phase oxide can be a pseudo-brookite. A spinel composition as disclosed herein can be mixed with a second phase pseudo-brookite with a formula of $AB_2O_5$, where A can be Y, La, or any element known in the art to occupy the A-site of this composition; and B can be Mn, Ti; or any element known in the art to occupy the B site. A mixed phase material such as these can provide improved sintering resistance of the spinel phase. Both phases can be made with crystallite sizes of about 2 nm to about 50 nm.

In another embodiment, the second phase oxide can be a rock-salt. A spinel composition as disclosed herein can be mixed with a second phase rock-salt composition such as $VO_2$, NiO, MnO, and any oxide composition known in the art to form this composition. A mixed phase material such as these can provide improved sintering resistance of the spinel phase. Both phases can be made with crystallite sizes of about 2 nm to about 50 nm.

In another embodiment, the second phase oxide can be a rare earth sesquioxide, such as lanthanide oxide ($Ln_2O_3$). A spinel can be mixed a second phase of a lanthanide oxide, where Ln can be La, Y, Nd, Sm, Gd, Tb or any other lanthanide or rare-earth metal. A mixed phase material such as these can provide improved sintering resistance of the spinel phase. Both phases can be made with crystallite sizes of about 2 nm to about 50 nm.

In another embodiment, the second phase oxide can be tin, silver, or titanium oxide. The mixed phase material of a spinel with a tin, silver, or titanium oxide can provide improved sintering resistance of the spinel phase. Both phases can be made with crystallite sizes of about 2 nm to about 50 nm.

In an embodiment, a transition metal based spinel (e.g., vanadium, titanium, yttrium, iron, manganese, niobium, zirconium, molybdenum, cobalt, rhodium, etc.) is mixed (e.g., in a phase mixture) with a second or third spinel of different composition. For example, a spinel composition as disclosed herein is mixed with a second spinel phase of $CuMn_2O_4+FeAL_2O_4$. A mixed phase material such as these can provide improved sintering resistance of the spinel phase. Both phases can be made with crystallite sizes of about 2 nm to about 50 nm In an embodiment, a phase mixture comprising a spinel composition and a second phase and/or second spinel on a support oxide can be made from a common solution by any technique known in the art (e.g., co-precipitation, nitrate decomposition, sol-gel, Pechini method, etc.). In an embodiment, a phase mixture of a spinel and cerium dioxide in the final material can be formed from a common solution of spinel components and cerium made from nitrates or any other method known in the art. In an embodiment, the phase mixture can be dried and calcinated. In another embodiment, a phase mixture of a spinel and zirconia can be formed from a common solution of spinel components and zirconium made from nitrates or any other method known in the art. In an embodiment, the phase mixture can be dried and calcinated to form a phase mixture of a spinel and zirconium dioxide. In yet another embodiment, a phase mixture of a spinel and alumina can be formed from a common solution of spinel components and aluminum made from nitrates or any other method known in the art. In an embodiment, the phase mixture can be dried and calcinated to form a phase mixture of a spinel and alumina.

Catalyst Systems

The spinel compositions described herein can be utilized as part of a catalyst system. A catalyst system can be used to clean emissions from a combustion engine or vehicle powered completely or in part by a combustion engine. The catalyst can be an oxidation catalyst for carbon monoxide, hydrocarbons, and nitrate oxidation. In an embodiment, the catalyst can be a three way catalyst for carbon monoxide, hydrocarbons, and nitric oxide conversion. In another embodiment, a catalyst can be on a filter for particulate matter (PM) control. In another embodiment, a catalyst can be on a filter for carbon monoxide, hydrocarbon, and nitric oxide removal from a gasoline direct injection engine.

A spinel catalyst or spinel-based catalyst coating can be placed in the close-couple position near an engine in a vehicle's emission control system. In another embodiment, a spinel catalyst or spinel-based catalyst coating can be placed as a second coated substrate downstream from a conventional PGM based catalyst (i.e., "second position", also known as an underfloor catalyst). In an embodiment, a spinel catalyst or spinel-based catalyst can be upstream from a conventional PGM based underfloor converter In yet another embodiment, a spinel composition can also be used as an oxygen storage material. For example, an after treatment system in a vehicle powered completely or in part by a combustion In an embodiment, a catalyst system includes a spinel composition, a substrate, and a washcoat. In an embodiment, the catalyst system is substantially free of platinum group metals. A washcoat can include at least one oxide solid, wherein the oxide solid can be a carrier material oxide, a catalyst, or a mixture thereof. A carrier material oxide can be one or more of an oxygen storage material, aluminum oxide, doped aluminum oxide, spinel, delafossite, lyonsite, garnet, perovskite, pyrochlore, doped ceria, fluorite, zirconium oxide, doped zirconia, titanium, tin oxide, silicon dioxide, and mixtures thereof. In an embodiment, a catalyst comprises one or more selected from the group consisting of a PGM transition metal catalyst, ZPGM transition metal catalyst, a mixed metal oxide catalyst, a zeolite catalyst, and mixtures thereof. In an embodiment, an oxygen storage material comprises one or more of cerium, zirconium, lanthanum, yttirum, lanthanides, actinides, and mixtures thereof. A catalyst system may optionally comprise an overcoat comprising at least one oxide solid, wherein the overcoat oxide solid comprises one or more of a carrier material oxide, a catalyst, and mixtures thereof. In an embodiment a spinel composition can be a coating on a ceramic or metallic flow-through.

In another embodiment, catalysts to control toxic emissions can have a composite composition including transition metal nano-particles or ions dispersed and supported on a surface of a support material. Support materials may be either micro-particles with a very large specific surface area or a highly porous matrix. In an illustrative embodiment, a catalyst exhibits a high level of heat resistance and is capable of ensuring stability and reliability in long-term service. At higher temperatures at which a catalyst functions, catalytic centers become massed together or agglomerated, and thereby decreases the effective surface area to result in the gradual degradation of the catalytic functions. Catalysts as described herein can be prepared by various methods including the co-precipitation method also disclosed herein.

A specific type of catalyst is a three way catalyst (TWC). Common three way catalysts work by converting carbon monoxide, hydrocarbons, and nitrogen oxides into less harmful compounds or pollutants. A common TWC converts pollutants in vehicle emissions. A lack of sufficient oxygen may occur either when oxygen derived from nitrogen oxide reduction is unavailable, or when certain maneuvers such as hard acceleration enrich the mixture beyond the ability of the converter to supply oxygen, as the TWC catalyst deteriorates because of aging, its ability to store oxygen diminishes, and the efficiency of the catalytic converter decreases.

Further, spinel compositions as disclosed herein can be can be used as oxygen storage materials for application in vehicle (powered completely or partially by a combustion engine) after treatment catalysts. In an embodiment, a TWC comprising a spinel composition as an OSM buffers the effects of rich and lean engine-out A/F transients. Such an OSM can also comply with on-board diagnostics.

A spinel composition can also be used as a substrate honeycomb support. For example, a spinel composition is mixed with appropriate amounts of binder and other additives as appropriate (cordierite, alumina, silicon carbide, aluminum titanate, etc.) followed by extruding and calcining. A honeycomb support with a spinel oxide can be coated with catalyst coatings using platinum group metals and support oxides as is customary for DOC and TWC use. In another embodiment, a honeycomb support with a spinel oxide can be coated with zeolite based materials for SCR performance.

In an embodiment, a method includes directing exhaust from a combustion engine through or flow over a catalyst as disclosed herein. In an embodiment, the catalyst decomposes nitrogen oxide in the exhaust. In an embodiment, the catalyst decomposes nitrogen oxide in the exhaust.

Batteries

In an illustrative embodiment, a spinel composition can be an active component of an anode or cathode in batteries. Spinel compositions as disclosed herein have properties useful for batteries. For example, a spinel composition has reduction-oxidation switching properties. In another example, a spinel composition in a cathode can reduce oxygen ($O_2$) to oxygen anions ("oxygen reduction reaction"). In an embodiment, a method includes reducing oxygen to oxygen anions by a cathodic spinel composition.

In an embodiment of a metal-air battery or a solid oxide fuel cell, an active component for either the anode and/or the cathode can include a spinel composition as disclosed herein. A spinel composition can also be useful in lithium batteries. In an embodiment, a lithium battery can include a spinel composition as an intercalation compound. In another embodiment, a cathode of a lithium battery or a low temperature fuel cell can include an active component comprising a spinel composition.

Thermoelectric Material

Thermoelectric materials (e.g., used in power generation and refrigeration) produce a phenomena where either a temperature difference creates an electric potential or an electric potential creates a temperature difference. In some embodiments thermoelectric systems comprising thermoelectric materials can convert these temperature differentials to electricity. Conventional systems are based on highly efficient metals and alloys that need to be encapsulated to avoid contact with oxygen and are not stable at higher temperatures. Costs are also a key factor in many applications. Spinel compositions as disclosed herein can be lowcost, air-stable, high-temperature stable thermoelectrics for operation at high temperatures. Spinel compositions as disclosed herein also have desirable electronic properties (carrier electron density and mobility) and thermal conductivity that can be reduced from a variety of mechanisms to enable a high thermoelectric co-efficient.

To improve thermoelectric efficiency of thermoelectric material, nano-scale or microscopic defects are introduced to decrease thermal conductivity of a composite. Atomic level defects can be oxygen vacancies or cation defects introduced by aliovalent metal dopants in the spinel structure itself. Such aliovalent dopants in a spinel include but are not limited to niobium, cerium, praseodymium, calcium, strontium, barium, aluminum, tantalum, tungsten, and tin. Nano-scale defects can be nano-scale second phases decorated at the interface or supported by a spinel oxide. A two-phase system (i.e., spinel and a second phase) can be engineered by exceeding the solid solubility limit of a dopant metal in a spine, thereby forcing the dopant metal to form a second phase oxide on a surface of the spinel. For example, a Cu—Mn—Ce system with Ce concentrations that exceed the solid solubility limit for Ce in a $Cu_xMn_{3-x}O_4$ spinel would produce nanoscaled $CeO_2$ existing as about 1 to about 10 nm crystallites on a surface of a spinel crystallite. A macro-scale defect can be from about 10 to about 1000 nm and engineered through a mixed phase or multi-phase approach. However, second and third phases are not a minor constituent on a spinel but rather a major phase component (i.e., allowed to form larger crystallites and structures).

In another embodiment, a mixed-phase material can include a spinel as disclosed herein and an oxide or oxides from the Ca—Co—O system. Spinets containing cobalt and other transition metals can be synthesized to exist in conjunction with well-known thermoelectric oxide materials such as those found in a Ca—Co—O. Oxides from the modified Ca—Co—M—O system, where M is Mn, Fe, V, Cu, or Ni, system can form a spinel and Ca—Co—O phase mixture. The interfaces between the oxide containing Ca and Co and the spinel phase can lower the thermal conductivity of thermoelectric material because of phonon scattering at the phase boundaries. In yet another embodiment, a mixed-phase material comprises a spinel a second phase thermoelectric material of ZnO and/or doped ZnO.

Reforming Reactions

Spinel compositions as disclosed herein can generate $H_2$ using CO (water-gas shift reaction or "WGSR") or hydrocarbons (steam reforming) at high space velocity over a range of temperatures.

Water-gas shift is when CO and steam react with a catalyst to produce a high amount of hydrogen and $CO_2$. The hydrogen can be captured and used for a range of downstream industrial processes (e.g., synthesis of ammonia), including use in fuel cells. Catalysts for a water-gas shift reactions can comprise a spinel or spinel composition as disclosed herein. In an embodiment, a process of producing a water-gas shift reaction includes catalyzing the reaction with a catalyst comprising a spinel as disclosed herein and capturing produced hydrogen.

Steam reforming is a well-known method of producing hydrogen, carbon monoxide, and other gases from hydrocarbon fuels. A method includes reacting steam with a hydrocarbon in a reforming catalyst (i.e., site of the reaction). In an illustrative embodiment, a reforming catalyst comprises a spinel. In an embodiment, a spinel composition as disclosed herein can be used in steam reforming where the hydrocarbon input is methane, natural gas, methanol, ethanol, etc. In an embodiment, steam reforming is performed at temperatures at about 700° C. to about 1100° C. In an embodiment, the reforming catalyst is a metal-based catalyst (e.g., nickel) comprising a spinel as disclosed herein. In an example, methane reacts with steam to produce carbon monoxide and hydrogen.

$$CH_4 + H_2O \leftrightarrow CO + 3H_2$$

Such steam reforming can be performed in a combustion engine or a fuel cell. A steam reforming can also convert non-methane hydrocarbons to hydrogen. For example, a general formula is the following:

$$C_nH_m + nH_2O \leftrightarrow (n+m/2)H_2 + nCO.$$

In an embodiment, a steam reforming process includes converting a hydrocarbon to hydrogen catalyzed by a catalyst comprising a spinel as disclosed herein and capturing produced hydrogen.

Polymers

In an embodiment, a spinel or a spinel composition can be mixed or blended with a polymeric formulation to produce a polymeric material. In an embodiment, a polymer can be a polyolefin. In an embodiment, a polymer can be a polypropylene or a polyethylene. In an embodiment, a polyethylene can be low density polyethylene, linear low density polyethylene, high density polyethylene, or mixtures thereof. In an embodiment, a polymer can be ethylene-vinyl acetate copolymers, ethylene-ethylacrylate copolymers, ethylene-acrylic acid copolymers, polymethylmethacrylate mixtures of at least two of the foregoing and the like. In an embodiment, a spinel can be added to a polymeric formulation, whereby the polymeric formulation is then extruded to form a polymeric material. In another embodiment, a spinel or spinel formulation can be deposited on a polymer (e.g., a film layer).

Definitions

The term "calcination" refers to a thermal treatment process applied to solid materials, in presence of air, to bring about a thermal decomposition, phase transition, or removal of a volatile fraction at temperatures below the melting point of the solid materials.

The term "carrier material oxide (CMO)" refers to support materials used for providing a surface for at least one catalyst.

The term "conversion" refers to the chemical alteration of at least one material into one or more other materials.

The term "co-precipitation" may refer to the carrying down by a precipitate of substances normally soluble under the conditions employed.

The term "catalyst" refers to one or more materials that may be of use in the conversion of one or more other materials.

The term "exhaust" refers to the discharge of gases, vapor, and fumes that may include hydrocarbons, nitrogen oxide, and/or carbon monoxide.

The term "impregnation" refers to the process of imbuing or saturating a solid layer with a liquid compound or the diffusion of some element through a medium or substance.

The term "lean condition" refers to exhaust gas condition with an R-value below 1.

The term "milling" refers to the operation of breaking a solid material into a desired grain or particle size.

The term "minor component" refers generally to a spinel structure having a presence of one or more elements selected from the group consisting of copper, nickel, cobalt, iron, manganese, chromium, and combinations thereof. The minor component can be in-phase (doping a crystallographic site) or second-phase (metal not doping the crystallographic sites of the spinel). Thereby a dopant case is a subset case of a minor component. For example, a minor component can be barium in a $CuFe_2O_4$ spinel and the structure can be determined in how the minor component is introduced to the spinel. For example, $CuFe_2O_4$ and BaO can be dissolved in a common solution, dried, and calcined to produce the oxide. The Ba will not dope the spinel site but will exist as a second-phase component. Alternatively, when Cu, Fe and Al are formed into a solution precursor, dried, and calcined to form the oxide phase, the Al dopes the Fe site producing a single phase $CuFe_{2-x}Al_xO_4$.

The term "overcoat" refers to at least one coating that may be deposited on at least one washcoat layer.

The term "oxidation catalyst" refers to a catalyst suitable for use in converting at least hydrocarbons and carbon monoxide.

The term "oxygen storage material (OSM)" refers to a material able to take up oxygen from oxygen rich streams and able to release oxygen to oxygen deficient streams The term "platinum group metal (PGM)" refers to platinum, palladium, ruthenium, iridium, osmium, and rhodium.

The term "R Value" refers to the number obtained by dividing the reducing potential by the oxidizing potential.

The term "rich condition" refers to exhaust gas condition with an R-value above 1.

The term "second phase" refers to additional and different compositions from any spinel. A second phase can describe a plurality of phases distinct from a spinel composition.

The term "spinel composition" refers to a combination of components that include a spinel that compose a substance. For example, a spinel composition can be spinel and a substrate.

The term "spinel structure" refers to the spinel molecule.

The term "substrate" refers to any material of any shape or configuration that yields a sufficient surface area for depositing a washcoat and/or overcoat.

The term "three-way catalyst (TWC)" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

The terms "treating," "treated," or "treatment" refer to drying, firing, heating, evaporating, calcining, or mixtures thereof.

The term "washcoat" refers to at least one coating including at least one oxide solid that may be deposited on a substrate.

The term "zero platinum group metal (ZPGM) catalyst" refers to a catalyst completely or substantially free of platinum group metals.

The invention claimed is:

1. A catalyst comprising a spinel having the general formula of $AB_2O_4$, wherein A and B are a transition metal, wherein A and B are not the same transition metal, and wherein A is selected from the group consisting of manganese (Mn), nickel (Ni), vanadium (V), silver (Ag), palladium (Pd), ruthenium (Ru), rhodium (Rh), platinum (Pt), molybdenum (Mo), niobium (Nb), titanium (Ti), magnesium (Mg), gallium (Ga), tin (Sn), thallium (Tl), lead (Pb), bismuth (Bi), and B is selected from the group consisting of iron (Fe), manganese (Mn), nickel (Ni), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Tl), lead (Pb), and bismuth (Bi).

2. The catalyst of claim 1, wherein the transition metal is selected from the group consisting of iron (Fe), manganese (Mn), nickel (Ni), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), etc.) and an "other metal" (i.e., aluminum (Al), magnesium (Mg), gallium (Ga), tin (Sn), thallium (Tl), lead (Pb), bismuth (Bi), and indium (In).

3. The catalyst of claim 1, wherein the spinel is rare-earth metal free.

4. The catalyst of claim 1, wherein the spinel further comprises a dopant.

5. The catalyst of claim 4, wherein the spinel has a general formula of $A_{1-x}D_xB_2O_4$, where D is the dopant.

6. The catalyst of claim 4, wherein the dopant is selected from the group consisting of vanadium, silver, palladium, ruthenium, rhodium, platinum, molybdenum, tin, calcium (Ca), strontium (Sr), barium (Ba), lithium (Li), titanium, lanthanum (La), samarium (Sm), gadolinium (Gd), yttrium (Y), neodymium (Nd), cerium (Ce), aluminum, gallium, magnesium, zirconium (Zr), and tungsten (W), and further wherein D is not the same metal as A or B.

7. The catalyst of claim 4, wherein the dopant is a low valence dopant.

8. The catalyst of claim 4, wherein the dopant is a high valence dopant.

9. The catalyst of claim 1, wherein the spinel is deposited on a substrate.

10. The catalyst of claim 9, wherein the substrate is a support oxide.

11. The catalyst of claim 10, wherein the support oxide is transition alumina, alpha alumina, titania, zeolite, silica, silicate, magnesium-silicate, silica-alumina, ceria, ceria-zirconia, lanthanide-doped ceria-zirconia, lanthanum doped alumina, and mixed metal oxide.

12. The catalyst of claim 11, wherein the mixed metal oxide is selected from the group consisting of fluorite, pyrochlore, perovskite, pseudo-brookite, lanthanide oxide, titanium oxide, silver oxide, and tin oxide.

13. The catalyst of claim 4, wherein the dopant is an aliovalent dopant.

14. A battery comprising an anode or cathode, wherein the anode or the cathode comprise an active ingredient comprising a spinel having the general formula of $AB_2O_4$, wherein A and B are each independently a transition metal, wherein A and B are not the same transition metal, and wherein A is selected from the group consisting of nickel (Ni), vanadium (V), palladium (Pd), ruthenium (Ru), rhodium (Rh), platinum (Pt), molybdenum (Mo), niobium (Nb), titanium (Ti), magnesium (Mg), gallium (Ga), tin (Sn), thallium (Tl), lead (Pb), bismuth (Bi) and indium (In), and B is selected from the group consisting of iron (Fe), nickel (Ni), cobalt (Co), copper (Cu), vanadium (V), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Ti), lead (Pb), bismuth (Bi), and indium (In).

15. A method of cleaning emissions from a combustion engine comprising directing exhaust from a combustion engine through or flow over a catalyst comprising a spinel having the general formula of $AB_2O_4$, wherein A and B are each independently a transition metal, wherein A and B are not the same transition metal, and wherein A is selected from the group consisting of manganese (Mn), nickel (Ni), vanadium (V), silver (Ag), palladium (Pd), ruthenium (Ru), rhodium (Rh), platinum (Pt), molybdenum (Mo), niobium (Nb), titanium (Ti), magnesium (Mg), gallium (Ga), tin (Sn), thallium (Tl), lead (Pb), bismuth (Bi), and B is selected from the group consisting of iron (Fe), manganese (Mn), nickel (Ni), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Tl), lead (Pb), and bismuth (Bi).

16. A polymeric material comprising a polymeric formulation and a spinel having the general formula of $AB_2O_4$, wherein A and B are each independently a transition metal, wherein A and B are not the same transition metal.

17. The polymeric material of claim 16 wherein the polymeric formulation comprises a polyolefin.

18. The polymeric material of claim 16 wherein the polymeric formulation comprises at least one of a polyethylene or a polypropylene.

19. The polymeric material of claim 18, wherein the polyethylene is low density polyethylene, linear low density polyethylene, high density polyethylene, or mixtures thereof.

20. The polymeric material of claim 16 wherein the polymeric formulation comprises ethylene-vinyl acetate copolymers, ethylene-ethylacrylate copolymers, ethylene-acrylic acid copolymers, polymethylmethacrylate mixtures of at least two of the foregoing, or mixtures thereof.

21. A method of generating hydrogen comprising reacting carbon monoxide and steam with a catalyst comprising a spinel having the general formula of $AB_2O_4$, wherein A and B are a transition metal, wherein A and B are not the same transition metal, and wherein A is selected from the group consisting of iron (Fe), manganese (Mn), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Tl), lead (Pb), bismuth (Bi), and indium (In), and B is selected from the group consisting of iron (Fe), manganese (Mn), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Tl), lead (Pb), bismuth (Bi), and indium (In).

22. The method of claim 21 further comprising capturing the hydrogen generated.

23. A method of generating hydrogen comprising reacting steam with a hydrocarbon in a reforming catalyst, wherein the reforming catalyst comprises a spinel having the general formula of $AB_2O_4$, wherein A and B are a transition metal, wherein A and B are not the same transition metal.

24. The method of claim 23, wherein the hydrocarbon is selected from the group consisting of methane, natural gas, methanol, and ethanol.

25. The method of claim 23, wherein said reacting is performed at temperatures at about 700° C. to about 1100° C.

26. A thermoelectric composition comprising a spinel and aliovalent dopant, wherein the spinel has an oxygen vacancy or cation defect, and wherein the spinel has the general formula of $AB_2O_4$, wherein A and B are a transition metal, wherein A and B are not the same transition metal, and wherein A is selected from the group consisting of iron (Fe), manganese (Mn), nickel (Ni) cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Tl), lead (Pb), bismuth (Bi) and B is selected from the group consisting of iron (Fe), manganese (Mn), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Tl), lead (Pb), and bismuth (Bi).

27. The thermoelectric composition of claim 26, wherein the aliovalent dopant is selected from the group consisting of niobium, cerium, praseodymium, calcium, strontium, barium, aluminum, tantalum, tungsten, and tin.

28. The thermoelectric composition of claim 26, wherein the dopant forms a second phase oxide on a surface of the spinel.

29. The thermoelectric composition of claim 28, wherein the spinel is $Cu_xMn_{3-x}Ce_xO_4$.

30. A spinel composition comprising a) spinel having the general formula of $AB_2O_4$, wherein A and B are a transition metal, wherein A and B are not the same transition metal; b) a binder; and optionally, c) an additive, and wherein A is selected from the group consisting of manganese (Mn), nickel (Ni), vanadium (V), silver (Ag), palladium (Pd), ruthenium (Ru), rhodium (Rh), platinum (Pt), molybdenum (Mo), niobium (Nb), titanium (Ti), magnesium (Mg), gallium (Ga), tin (Sn), thallium (Tl), lead (Pb), bismuth (Bi), and B is selected from the group consisting of iron (Fe), manganese (Mn), nickel (Ni), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Tl), lead (Pb), and bismuth (Bi).

31. A honeycomb support comprising the spinel composition of claim 30 and a platinum group metal catalyst coating.

32. A honeycomb support comprising the spinel composition of claim 30 and an alumina based material.

33. The method of claim 15, wherein the catalyst is a second coated substrate downstream from a conventional PGM based catalyst.

34. The method of claim 15, wherein the catalyst is upstream from a conventional PGM based underfloor converter.

35. An oxygen storage material comprising a spinel having the general formula of $AB_2O_4$, wherein A and B are a transition metal, wherein A and B are not the same transition metal.

36. The oxygen storage material of claim 35, wherein the oxygen storage material comprises about 10 to about 90 wt % of a catalytic coating.

37. A catalytic converter comprising
  i) a spinel having the general formula of $AB_2O_4$, wherein A and B are a transition metal, and wherein A and B are not the same transition metal;
  ii) a platinum group metal (PGM), and wherein A is selected from the group consisting of manganese (Mn), nickel (Ni), vanadium (V), silver (Ag), palladium (Pd), ruthenium (Ru), rhodium (Rh), platinum (Pt), molybdenum (Mo), niobium (Nb), titanium (Ti), magnesium (Mg), gallium (Ga), tin (Sn), thallium (Tl), lead (Pb), bismuth (Bi), and B is selected from the group consisting of iron (Fe), manganese (Mn), nickel (Ni), cobalt (Co), copper (Cu), vanadium (V), silver (Ag), palladium (Pd), ruthenium (Ru), rhodium (Rh), platinum (Pt), molybdenum (Mo), niobium (Nb), titanium (Ti), aluminum (Al), magnesium (Mg), gallium (Ga), tin (Sn), thallium (Tl), lead (Pb), and bismuth (Bi).

38. The catalytic converter of claim 37, wherein the spinel and the PGM component or layer is deposited or coated on a substrate.

39. The catalytic converter of claim 38, wherein the substrate is cordierite.

40. The catalytic converter of claim 37, wherein the platinum group metal is selected from the group consisting of platinum, palladium, and rhodium.

41. The catalytic converter of claim 37, wherein the catalytic converter is a single layer catalyst, wherein the spinel and the PGM component are inter-mixed.

42. The catalytic converter of claim 37, wherein the PGM component is supported on a carrier.

43. The catalytic converter of claim 42, wherein the carrier is selected from the group consisting of alumina, titania, zirconia, ceria, cerium-based OSM, tin oxide, and zeolite.

44. The catalytic converter of claim 37, wherein the catalytic converter is a double layer catalyst, wherein the spinel and the PGM are in separate, distinct layers.

45. The catalytic converter of claim 37, wherein the catalytic converter is a double layer catalyst, wherein a first layer comprises a first PGM and a first spinel, and a second layer comprises a second PGM and a second spinel.

46. The catalytic converter of claim 37, wherein the PGM is impregnated onto a surface of the spinel.

47. The catalytic converter of claim 37, wherein the PGM is coated on a surface of the spinel.

48. The catalytic converter of claim 38, wherein the substrate is zone-coated with the spinel and the PGM.

49. The catalytic converter of claim 48, wherein the zone-coated substrate is coated with a spinel in a first region and coated with a PGM in a second region, wherein the first region is not coated with a PGM and the second region is not coated with a spinel.

50. The catalytic converter of claim 48, wherein the zone-coated substrate is coated with a PGM on a spinel composition in a first region and coated with a spinel without PGM in a second region.

* * * * *

UNITED STATES PATENT AND TRADEMARK OFFICE
CERTIFICATE OF CORRECTION

PATENT NO. : 9,511,358 B2  
APPLICATION NO. : 14/503003  
DATED : December 6, 2016  
INVENTOR(S) : Nazarpoor et al.

Page 1 of 1

It is certified that error appears in the above-identified patent and that said Letters Patent is hereby corrected as shown below:

In the Claims

Column 12,  
Line 56, Claim 14 "thallium (Ti)" should read --thallium (T1)--.

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*